(12) United States Patent
Suxena

(10) Patent No.: US 11,064,562 B2
(45) Date of Patent: Jul. 13, 2021

(54) EMERGENCY NOTIFICATION SMS MESSAGING DURING E911 CALL

(71) Applicant: T-Mobile USA, Inc., Bellevue, WA (US)

(72) Inventor: FNU Vishesh Raj Suxena, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/668,632

(22) Filed: Oct. 30, 2019

(65) Prior Publication Data

US 2020/0068650 A1 Feb. 27, 2020

Related U.S. Application Data

(63) Continuation of application No. 15/802,135, filed on Nov. 2, 2017, now Pat. No. 10,499,454.

(51) Int. Cl.
*H04M 11/04* (2006.01)
*H04W 4/00* (2018.01)
(Continued)

(52) U.S. Cl.
CPC ............ *H04W 76/50* (2018.02); *G01S 5/02* (2013.01); *G01S 19/48* (2013.01); *G08B 25/016* (2013.01);
(Continued)

(58) Field of Classification Search
CPC ....... H04W 76/50; H04W 4/14; H04W 4/023; H04W 4/90; G01S 19/48; G01S 5/02; G01S 2205/006; G01S 19/17; G08B 25/016
(Continued)

(56) References Cited

U.S. PATENT DOCUMENTS 9,398,619 B1 7/2016 Sennett et al.
2007/0060097 A1* 3/2007 Edge .................. H04L 65/1006
455/404.1
(Continued)

OTHER PUBLICATIONS

Office Action for U.S. Appl. No. 15/802,135, dated Jul. 1, 2019 Suxena, "Emergency Notification SMS Messaging During E911 Call", 17 pages.
(Continued)

*Primary Examiner* — Mark G. Pannell
(74) *Attorney, Agent, or Firm* — Lee & Hayes, P.C.

(57) ABSTRACT

This disclosure is directed to generating and sending an emergency notification short message service (SMS) message to one or more registered contacts of a user when the user's user equipment (UE) is used to call enhanced 911 (E911). The E911 call may be placed either as a voice over long term evolution (VoLTE) or as a voice over WiFi (VoWiFi) call. The emergency contacts may be previously designated by the user, and saved to a profile associated with the user. When the user calls E911, a gateway mobile location center (GMLC) system may cooperate with one or more other components of a mobile communications network to route the E911 call to a nearby public safety answering point (PSAP) based at least in part on location information of the UE from which the E911 call was placed. This same location information may be provided in the emergency notification SMS message.

20 Claims, 10 Drawing Sheets

(51) Int. Cl.
| | |
|---|---|
| *H04W 24/00* | (2009.01) |
| *H04W 76/50* | (2018.01) |
| *H04W 4/14* | (2009.01) |
| *G08B 25/01* | (2006.01) |
| *G01S 19/48* | (2010.01) |
| *G01S 5/02* | (2010.01) |
| *G01S 19/17* | (2010.01) |

(52) U.S. Cl.
CPC ............ *H04W 4/14* (2013.01); *G01S 19/17* (2013.01); *G01S 2205/006* (2013.01)

(58) Field of Classification Search
USPC ...................................................... 455/404.1
See application file for complete search history.

(56) References Cited

U.S. PATENT DOCUMENTS

| | | |
|---|---|---|
| 2007/0135146 A1 | 6/2007 | Rezaiifar et al. |
| 2008/0108319 A1 | 5/2008 | Gallagher |
| 2008/0188198 A1 | 8/2008 | Patel et al. |
| 2009/0047924 A1 | 2/2009 | Ray et al. |
| 2010/0195805 A1 | 8/2010 | Zeigler et al. |
| 2013/0122932 A1 | 5/2013 | Patel et al. |
| 2013/0231072 A1 | 9/2013 | Anderson et al. |
| 2015/0156321 A1 | 6/2015 | Abnett et al. |
| 2015/0230057 A1 | 8/2015 | Jiang et al. |
| 2015/0327039 A1 | 11/2015 | Jain |
| 2016/0088450 A1 | 3/2016 | Bendi et al. |
| 2016/0373910 A1 | 12/2016 | Moss |
| 2017/0156045 A1 | 6/2017 | Balabhadruni et al. |
| 2017/0372592 A1 | 12/2017 | Neravati et al. |
| 2018/0033289 A1 | 2/2018 | Lee |
| 2018/0075720 A1 | 3/2018 | Davies et al. |
| 2019/0132903 A1 | 5/2019 | Suxena |

OTHER PUBLICATIONS

Office Action for U.S. Appl. No. 15/802,135, dated Mar. 1, 2019, Suxena, "Emergency Notification SMS Messaging During E911 Call", 40 pages.

Office Action for U.S. Appl. No. 15/802,135, dated May 23, 2018, Suxena, "Emergency Notification SMS Messaging During E911 Call", 36 pages.

Office Action for U.S. Appl. No. 15/802,135, dated Sep. 27, 2018, Suxena, "Emergency Notification SMS Messaging During E911 Call", 43 pages.

Popper, Ben, "Apple Watch can call 911 with a single button press," Jun. 13, 2016, downloaded from https://www.theverge.com/2016/6/13/11923244/apple-watch-can-call-911, 6 pages.

Safety Smart911, "How it works," downloaded Oct. 25, 2017 from https://safety.smart911.com/, 4 pages.

Shueh, Jason, "New app calls 911 and notifies family in two taps," Feb. 26, 2014, downloaded from http://www.govtech.com/applications/new-app-calls-911-and-notifies-family-in-two-taps.html, 6 pages.

* cited by examiner

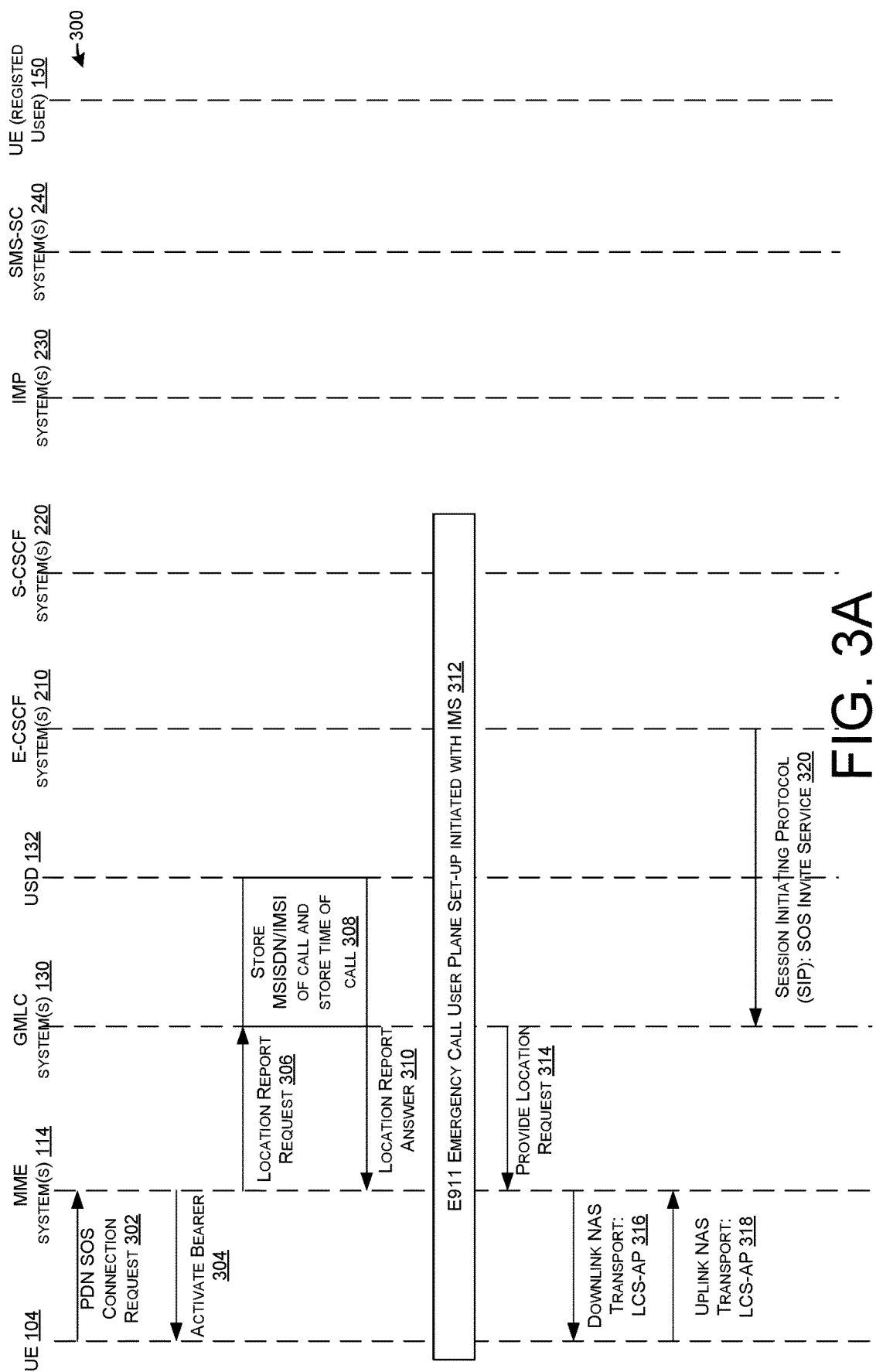

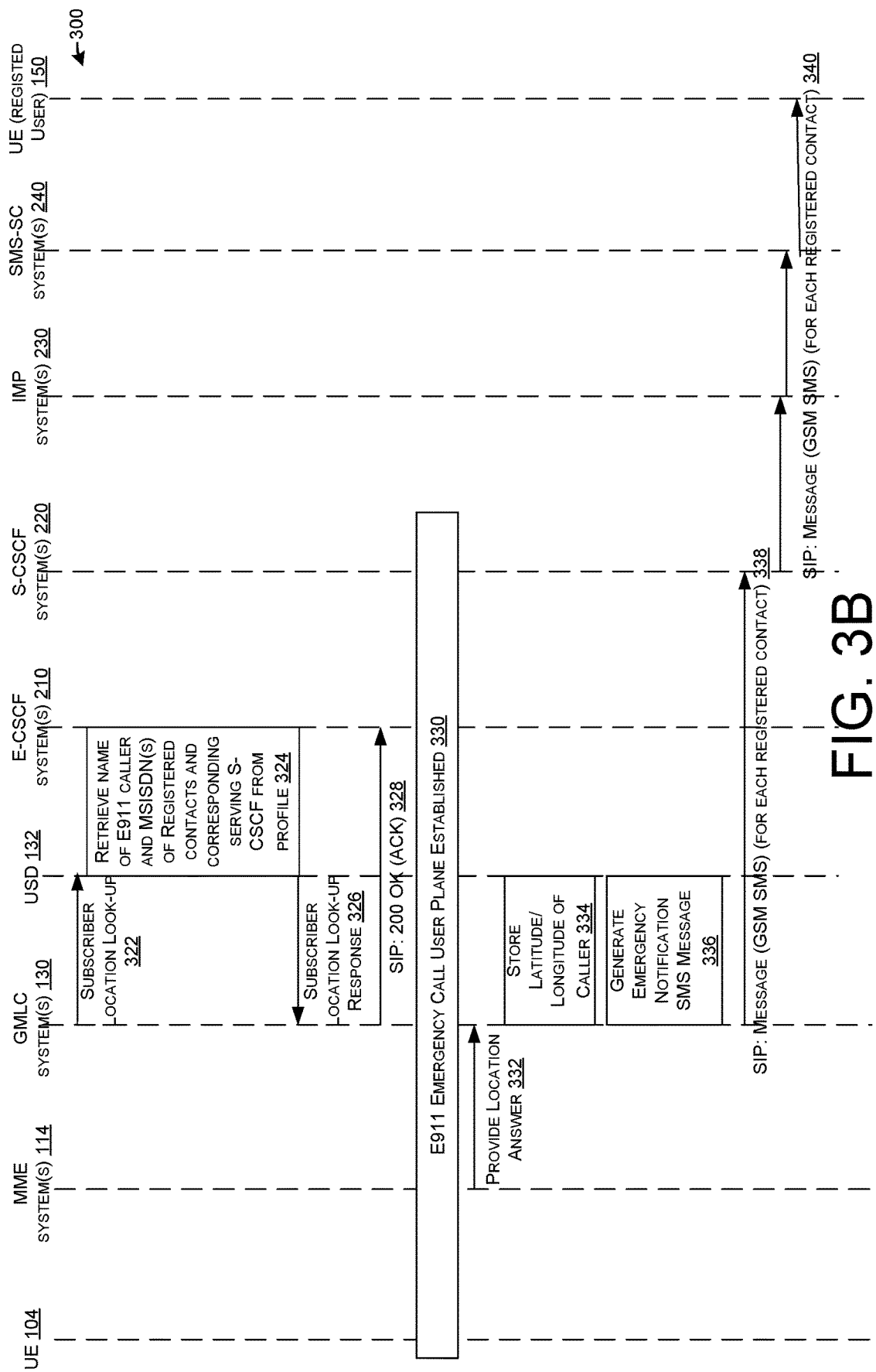

EMERGENCY NOTIFICATION SMS MESSAGING DURING E911 CALL

CROSS REFERENCE TO RELATED APPLICATIONS

This application is a continuation of co-pending U.S. patent application Ser. No. 15/802,135 filed Nov. 2, 2017, which is incorporated herein by reference in its entirety.

BACKGROUND

Enhanced 911 (E911) service, as provided by mobile telephone service providers, may enable routing of E911 calls to a public safety answering point (PSAP) that may be relatively close to the user equipment (UE) from which the E911 call was placed. This enables the PSAP to dispatch first responders and/or provide other emergency services that may be geographically relevant to the E911 caller who is seeking assistance. The mobile telephone service providers may use a variety of location information to route the E911 call to a PSAP that is in proximity to the UE. In this way, first responders may be dispatched in the locality of where the E911 call was placed.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 3A and 3B illustrate flow diagrams of an example method by which emergency notification SMS messages are sent to registered contacts when E911 is called via voice over long term evolution (VoLTE) by a user, in accordance with example embodiments of the disclosure.

DETAILED DESCRIPTION

Figure 1:
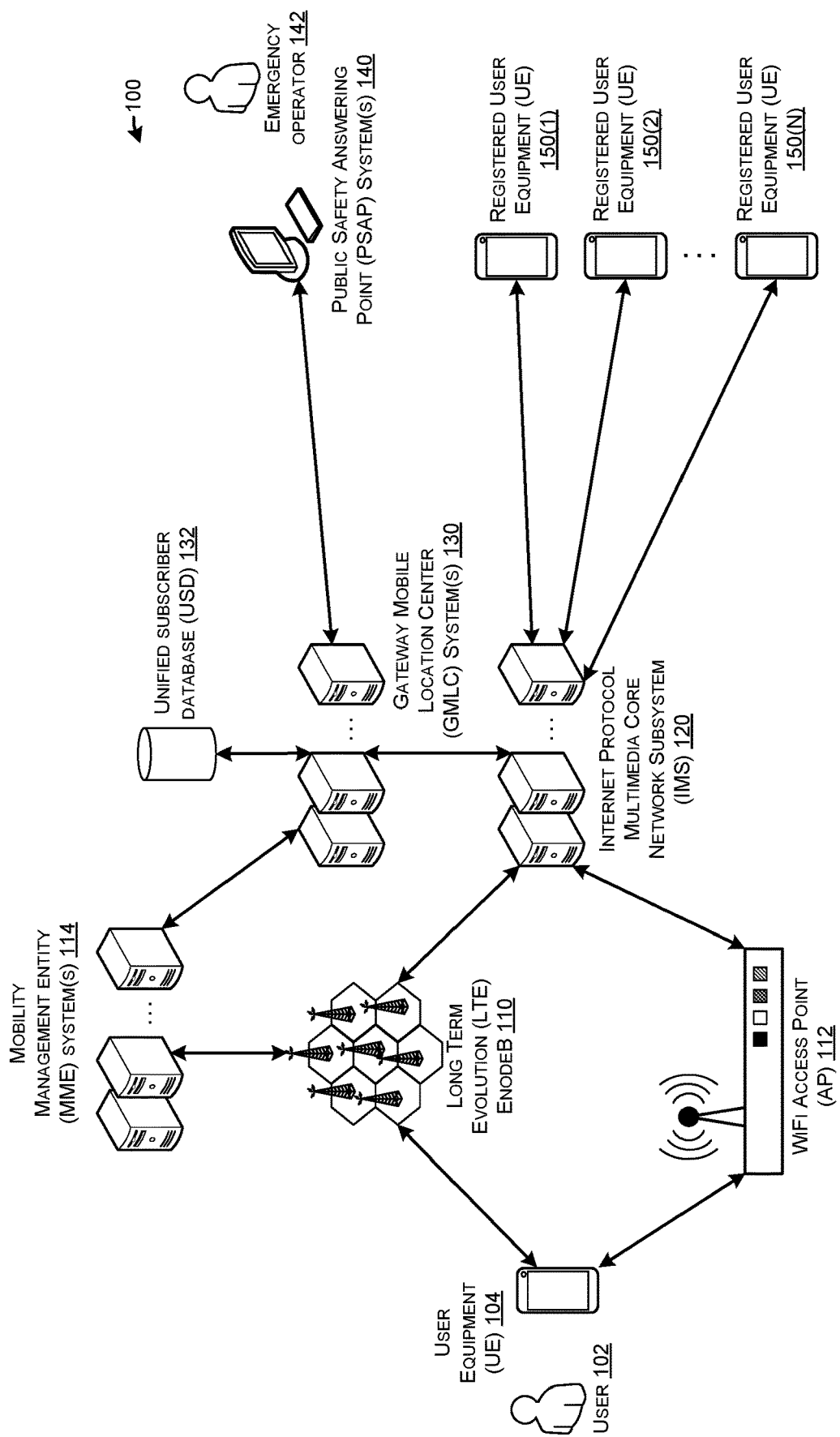
FIG. 1 illustrates a schematic diagram of an example environment with a variety of elements that result in short message service (SMS) message(s) to be sent to user equipment of registered contacts to receive emergency notification SMS messages when a user calls E911, in accordance with example embodiments of the disclosure.

Example embodiments of this disclosure describes methods, apparatuses, computer-readable media, and systems for sending an emergency notification short message service (SMS) message to registered contacts of a user, when the user dials enhanced 911 (E911). The registered contacts to whom the SMS messages are to be sent, may be designated by the user. The SMS messages may include any variety of emergency information. For example, the SMS message in example embodiments may include a time when the user called E911, a name of the user, a location of the user, such as in latitude and longitude coordinates, a media access control (MAC) address of a WiFi access point (AP) from where the E911 call was placed, and/or a message indicating that the SMS message is being sent because the user designated the registered contact.

It should be appreciated that in many cases, sending this type of emergency notification SMS message may enhance the cause of providing assistance and/or notifying those who would otherwise need to be notified of an emergency situation faced by the user. Consider, for example, when a E911 call is placed, it may take 10 or more minutes for first responders (e.g., police, firefighters, ambulance, etc.) to arrive at a location where assistance may be needed. However, if an emergency notification SMS is sent to one or more contacts, such as a next-door neighbor, the neighbor may be able to arrive at the location of emergency faster than the first responders and start providing assistance until the first responders arrive. During an emergency, such rapid deployment of assistance may be beneficial.

Further consider that in some situations, family members, other loved ones, and/or friends may not be notified of an emergency for several hours. By sending an emergency notification text message, such notification may occur much sooner than it would otherwise.

According to example embodiments, the user who dials the E911 service may be a subscriber of a mobile carrier service provider and may have a profile and/or subscriber information stored on a component, such as a unified subscriber database (USD), of a mobile carrier network operated by the mobile carrier service provider. The user may be able to designate emergency contact(s), such as by providing mobile phone number(s), to the mobile carrier service network. These mobile phone number(s) and/or the corresponding mobile station international subscriber directory number (MSISDN)/international mobile subscriber identity (IMSI) numbers of the user designated emergency contact(s) may be stored on the profile of the user on the USD.

In example embodiments, when the user dials E911 from his or her user equipment (UE), either as a voice over long term evolution (VoLTE) call or a voice over WiFi (VoWiFi) call, the detection of the E911 call may invoke gateway mobile location center (GMLC) system(s) to cooperate with components of the service provider network to determine the location of the UE. This location service may be invoked for properly routing the E911 call, such as to a nearby public safety answering point (PSAP). Thus, the GMLC system(s) may be aware of the location of the UE from which the E911 call is placed. This location, in example embodiments, may be the latitude and longitude of the UE when the E911 call is placed. In other example embodiments, the location information may be the MAC address of a WiFi AP from which the call (VoWiFi) is routed.

According to example embodiments, the GMLC system(s) may use the location information of the UE when the E911 call is placed to generate an emergency notification SMS message. This SMS message, in some example embodiments, may include the location information. In example embodiments, the SMS message may further include the time when the E911 call was placed. The GMLC system(s) may further be configured to query the USD to access user profile information to determine the registered contact information for the user. This registered contact information may include the MSISDN and/or IMSI information of the registered contacts. Additionally, in some example embodiments, the serving-call session control function (S-CSCF) system(s) corresponding with each of the registered contacts may be determined based at least in part on accessing the USD.

In example embodiments, once the GMLC system(s) have generated the emergency notification SMS message for a user, and further determined registered contacts and/or their routing information, the GMLC system(s) may send the emergency notification SMS message to each of the emergency contacts. This may entail transmitting the SMS message to each of the S-CSFC system(s) of each of the registered contacts of the user. The SMS message may subsequently be routed through various components of an internet protocol multimedia core network subsystem (IMS) to deliver the SMS message to each of the UEs of the registered contacts.

In example embodiments, such as in the case of a VoLTE E911 call, the GMLC system(s) may interact with a mobility management entity (MME) of the IMS to determine the location information of the UE from which the E911 call was placed. The MME, in turn may interact with the UE to determine the UE's location.

In some cases, the UE may determine its location using global satellite navigation system signals (GNSS) (e.g., global positioning satellite (GPS)). In other cases, the UE may report cell tower(s), such as evolved node B (eNodeB), that are in proximity along with signal strength from those eNodeB. This information may be used by the MME, or alternatively by the UE itself, to determine its location. Such a determination would be based at least in part on a registry of locations of various eNodeB, as well as triangulation processes. Location information may further be determined, in some example embodiments, from known locations of WiFi APs to which the UE is, or was most recently connected. In yet another example embodiment, inertial sensor (e.g., accelerometer) data may be used, by itself, or in conjunction with GNSS data and/or WiFi AP locations, and/or eNodeB-based triangulation to determine location information of the UE from which the E911 call originates.

In example embodiments, such as in the case of a VoWiFi E911 call, the GMLC system(s) may receive location information as part of a session initiation protocol (SIP), such as a SIP: SOS invite service. In this case, the UE may provide location information, such as latitude and longitude information to one or more entities of the IMS, such as emergency-call session control function (E-CSCF) system(s). In other case, the UE may provide, and the GMLC system(s) may receive the MAC address of the WiFi AP through which the UE is placing the E911 call.

Regardless of what type of location information the GMLC system(s) receive, the GMLC system(s) may temporarily store that location data so that it can access that data later to generate the emergency notification SMS message. Thus, in example embodiments, the same location information services the GMLC provides for routing the E911 call to the nearest, or at least a relatively close PSAP, may be used in generating and sending the emergency notification SMS messages, as described herein.

According to example embodiments, the emergency notification SMS messages, as described herein, may be sent from within the service provider network, and triggered by components of the service provider network. In example embodiments, the emergency notification SMS messages may be sent without invoking any over the top (OTT) applications on the UE from which an E911 call is placed. In other words, from the perspective of the UE placing the E911 call, sending the emergency SMS messages may be substantially seamless.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with a variety of elements that result in short message service (SMS) message(s) to be sent to user equipment 150(1), 150(2), . . . , 150(N) of registered contacts to receive emergency notification SMS messages when a user 102 calls E911, in accordance with example embodiments of the disclosure.

The example environment 100 may include the user 102. The user 102 may be a subscriber of a mobile communications service provider and can place calls and/or engage in other services (e.g., data, SMS, etc.) via an internet protocol multimedia subsystem (IMS) 120. The user 102 may be able to access the IMS 120 by at least a long term evolution (LTE) route via eNodeB 110 and mobility management entity (MME) systems 114, or by WiFi via a WiFi access point (AP) 112.

The environment 100 may further include gateway mobile location center (GMLC) system(s) 130 that are communicatively coupled to the IMS 120 and further communicatively coupled to public safety answering point (PSAP) system(s) 140. The GMLC system(s) 130 may be further communicatively coupled to a unified subscriber database (USD) which may store various information about the user 102, such as, for example his or her registered contacts. The PSAP system(s) 140 may have an emergency operator 142 who can receive E911 calls, and dispatch emergency assistance (e.g., police, firefighters, ambulance, and/or other first responders). The environment may still further include one or more registered user equipment (UE) 150(1), 150(2), . . . , 150(N), hereinafter referred to individually or collectively as registered user equipment 150.

Although the UE 104 and/or UE 150 are shown as smartphones, it will be appreciated that the UE 104 and/or the UE 150 may be any suitable UE that can make VoLTE and/or VoWiFi calls and/or receive text messages. UE 104 and/or UE 150 may include, but is not limited to, televisions, set-top boxes, computers, computing devices, servers, notebook computers, netbook computers, personal digital assistants (PDAs), smartphones, telephones, tablets, in-vehicle infotainment systems (IVIs), combinations thereof, or the like.

The LTE eNodeB 110 may be any suitable cellular infrastructure through which the UE 104 may be configured to place a telephone call or receive data and/or text message services via the IMS 120. The LTE eNodeB 110 may provide access technology, such as a radio network for the UE 104 to access the IMS 120. The LTE eNodeB 110 and the MME system(s) 114 may include control functionality and may communicate with the UE 104 via any suitable standard, such as wideband code division multiple access (WCDMA), Time Division Synchronous Code Division Multiple Access (TD-SCDMA), or the like. Thus, the LTE eNodeB 110 may provide a gateway, via any suitable standard, between the UE 104 and the IMS 120.

The MME system(s) 114 may, in example embodiments, be a node of contact between the LTE eNodeB 110 and the IMS 120. The MME system(s) 114 may interact with the UE 104 when the UE 104 is to connect to the IMS 120. In some cases, the UE 104 in these situations may actively try to connect to the IMS 120 via the LTE eNodeB 110, and in other cases, the UE 104 may be in idle mode and the MME 114 may engage in a process of paging the UE 104. The MME system(s) 114 may further be configured to establish a non-access stratum (NAS) communication (e.g., highest stratum of control plane communications) with the UE 104. In example embodiments, the MME system(s) 114 may be configured to query the location of the UE 104 by communication over the NAS channel.

The WiFi AP 112 may be any suitable gateway to a network, such as the Internet, for connecting to the IMS 120. The communications between the UE 104 and the WiFi AP 112 may be by any suitable standards, such as standards set in institute of electrical and electronics engineers (IEEE) 802.11.

The IMS 120 may provide a variety of voice, data, and/or text message services. In example embodiments, the IMS 120 may have a number of components for receiving and routing calls, such as VoLTE calls, VoWiFi calls, wireless-to-wireless calls, wireless-to-landline calls, E911 calls, and/or the like, to their appropriate destinations. The IMS 120 may further include components that may route SMS messages, such as to the registered UE(s) 150. Some of the components of the IMS 120 will be described in greater detail below in conjunction with FIG. 2. In example embodiments, the IMS 120 may be substantially similar to an architectural framework defined by the 3rd Generation Partnership Project (3GPP) for delivering IP multimedia to UEs 104, 150.

The GMLC system(s) 130 may be invoked when one or more components of the IMS 120 requests location services. These location services may be for a variety of operations, such as routing an E911 call to the nearest PSAP. The GMLC system(s) 130 may be configured to cooperate with a variety of other elements, such as a mobility management entity (MME) of the IMS 120 and/or LTE eNobeB 110 to determine the location of the UE 104, such as in the case of a VoLTE E911 call. The GMLC system(s) 130 may further be configured to determine the location of the UE 104 by interpreting messages, such as handshaking messages and/or any variety of session initiating protocol (SIP) messages received from the WiFi AP 112, such as in the case of a VoWiFi E911 call. Thus, the GMLC system(s) 130 may be configured to provide the location information about the UE 104 needed to route an E911 call from the UE 104 to the nearest, or at least a relatively spatially proximal, PSAP system 140.

According to example embodiments of the disclosure, the GMLC system(s) 130 may further be configured to determine location information of the UE 104 from which an E911 call originates, and use that information to generate an emergency notification SMS message to be sent to registered UEs 150, as previously designated by the user 102. For example, the GMLC system(s) 130 may determine the location, such as a latitude coordinate and a longitude coordinate, of the UE 104 and/or a MAC address of the WiFi AP 112 from which the E911 call is placed. This information (e.g., latitude, longitude, MAC address, etc.) may be used to generate an SMS message, by the GMLC system(s) 130, when the GMLC system(s) 130 are invoked for providing location services for an E911 call.

According to further example embodiments of the disclosure, the GMLC system(s) 130 may be configured to determine a time when a E911 call is received from a UE 104 and store this time of call. This time of call information may later be incorporated into the emergency notification SMS message generated by the GMLC system(s) 130 to send to the registered UE(s) 150.

The GMLC system(s) 130 may configured to access a unified subscriber database (USD) 132 to access a profile of the user 102 associated with the UE 104 from which a E911 call is placed. The USD 132 may be updated by any number of entities, such as one or more components of the IMS 120, or other web server(s) from which user 102 may be able to update his or her user information and/or profile. The USD 132 may contain information and associations of the user 102 to his or her UE 104, such as the MSISDN and/or IMSI information, as well as the user's name. The USD 132 may further include information about a user's 102 preselected emergency notification contacts. For example, the USD 132 may associate the MSISDN/IMSI information of the registered UEs 150 to the user's profile on the USD 132. Although, depicted as a USD 132, it should be appreciated that the functions of the USD 132 may be served by any suitable network subscriber database that may store user profiles for network sub scribers.

The GMLC system(s) 130 may be configured to access the USD 132 and retrieve the profile of the user 102 and, from the profile, determine a variety of information about the user 102 and his or her account that enables the routing of the E911 from the UE 104 to the appropriate PSAP system(s) 140, as well as for sending the emergency notification SMS message to the registered UE(s) 150. For example, the GMLC system(s) 130 may be configured to access the USD to determine the MSISDN/IMSI, or any other appropriate identification of the registered UE(s) 150, to initiate sending the emergency notification SMS message, as described herein.

It should be noted that although UE 104 and UE(s) 150 are depicted as smartphones, the UE 104 and/or UE(s) 150 may be any variety of electronic devices that are configured to place E911 calls and/or receive SMS messages, as described herein. It should further be noted that although the GMLC system(s) 130 and the USD 132 are depicted as distinct from the IMS 120, in example embodiments, the GMLC system(s) 130 and/or the USD may be components of the IMS 120.

Figure 2:
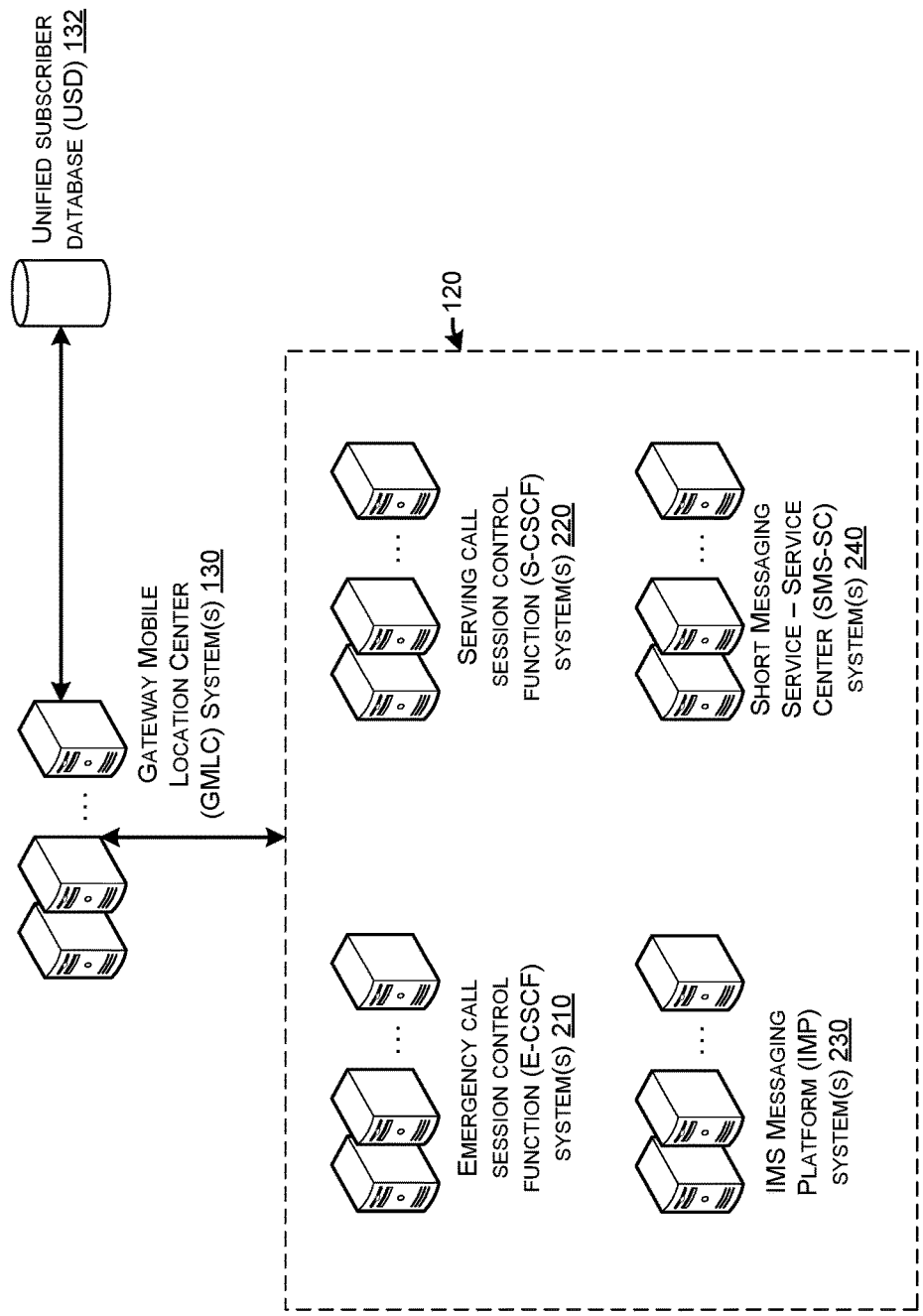
FIG. 2 illustrates a schematic diagram of a variety of systems that may participate to transmit emergency notification SMS messages when E911 is called, in accordance with example embodiments of the disclosure.

FIG. 2 illustrates a schematic diagram of a variety of systems that may participate to transmit emergency notification SMS messages when E911 is called, in accordance with example embodiments of the disclosure.

The IMS 120 may include a variety of component systems, such as emergency-call session control function (E-CSCF) system(s) 210, serving-call session control function (S-CSCF) system(s) 220, IMS messaging platform (IMP) system(s) 230, and/or short messaging service-service center (SMS-SC) system(s) 240. The IMS 120 may include additional or fewer systems than those depicted here, in accordance with example embodiments of the disclosure.

The E-CSCF system(s) 210 may, in example embodiments, provide services for establishing and tear-down of an E911 call. When one or more other entities of the IMS 120 identifies that an incoming call is an E911 call, the E-CSCF system(s) 210 may be invoked. In example embodiments, an incoming session initiating protocol (SIP) message may be identified as being for an emergency call, and then forwarded to the E-CSCF system(s) 210. At that point, the E-CSCF system(s) 210 may cooperate with other entities of the IMS 120 and/or the GMLC system(s) 130 to determine the location of the UE 104 for the purposes of routing the E911 call.

The S-CSCF system(s) 220 may, in example embodiments, provide services at a signaling plane of the IMS 120. The S-CSCF system(s) 220 may provide services of a SIP register and/or SIP redirection for incoming SIP messages. The S-CSCF system(s) 220 may further be responsible for location registration of the UE 104 and call routing and processing.

The IMP system(s) 230 and SMS-SC system(s) 240 may, in example embodiments, cooperate to route SMS messages to their destination. According to example embodiments, the IMP system(s) 230 may receive an emergency notification SMS (via SIP) from the S-CSCF system(s) 220 and route the SIP to the SMS-SC system(s) 240 which may then deliver the emergency notification SMS to each of the registered UE 150.

It should be understood that the systems depicted in FIG. 2 may be some of the systems that may be part of a LTE IMS 120. Indeed, the systems depicted in FIG. 2 may be systems that may provide services for routing emergency notification SMS messages, as disclosed herein. However, there may be additional systems with which the depicted systems may interact and cooperate within the IMS 120 to provide the functionality, as disclosed herein. For example, and without limitations, there may be a home subscriber server (HSS) and/or other components as part of the IMS 120.

FIGS. 3A and 3B illustrate a flow diagram of an example method 300 by which emergency notification SMS messages are sent to registered contacts when E911 is called via voice over long term evolution (VoLTE) by a user 102, in accordance with example embodiments of the disclosure.

At 302, a packet data network (PDN) SOS connection request may be sent by the UE 104 to the MME system(s) 114. This connection request may be responsive to the user 102 of the UE 104 dialing 911 on the UE 104 to request emergency services. The PDN SOS connection request may be received at the MME system(s) 114 via the LTE eNodeB 110.

At 304, a bearer may be activated responsive to the PDN SOS connection request. In other words, a connection may be established between the UE 104 and the MME system(s) 114 to enable the establishment of the E911 call. This bearer may stay active throughout the process of placing the E911 call and sending emergency notification SMS messages, as described herein.

At 306, the MME system(s) 114 may send a location report request (LRR) to the GMLC system(s) 130. The LRR may include location data of the user 102. In response to the LRR, the GMLC system(s) 130, at block 308, may determine the time of the E911 call and store the time of the call along with an identification of the UE 104 from which the E911 call was placed. This identification may be the MSISDN and/or IMSI of the UE 104. The time of the call may be determined form recording the time when the LRR is received at the GMLC system(s) 130. The GMLC system(s) 130, at 310, may send a location report answer (LRA) to acknowledge the receipt of the LRR from the MME system(s) 114.

At 312, an E911 emergency call user plane set-up may be initiated with the IMS 120. This may entail procedures for determining the appropriate PSAP to connect to and establishing that voice call connection. At 314, the GMLC system(s) 130 may provide a location request to the MME system(s) 114. This location request may be for the GMLC system(s) 130 to receive a location of the UE 104 from the MME system(s) 114.

At 316, the MME system(s) 114 may establish a downlink non-access stratum (NAS) transport layer to perform a location service application protocol (LCS-AP). The UE 104 may interact, at 318, via an uplink NAS transport link to perform the LCS-AP. In fact, the UE 104 and the MME system(s) 114 may communicate with each other several times via the uplink and/or downlink NAS transport layer. At the conclusion of the interactions between the UE 104 and the MME system(s) 114 may provide the MME system(s) 114 with the location (e.g., latitude and longitude, etc.) of the UE 104.

At 320, the E-CSCF system(s) 210 may send a session initiating protocol (SIP) of SOS invite service to the GMLC system(s) 130. The E-CSCF system(s) may initiate this SIP: SOS invite service based at least in part of the initiation of the user plane set-up at 312.

Session initiation protocols (SIPs) may be used for transmitting SIP messages in a signaling portion of a communication session, as opposed to the data or media stream portion of the communication session. Such SIP messages may include, but is not limited to, registration messages, communication session messages, and the like, which may be sent to the IMS 120 of the telecommunications network, and received therefrom. SIP is a signaling protocol that may be used to establish, modify, and terminate communication sessions over packet networks, and to authenticate access to IMS-based services. As used herein, a SIP request is a message that is sent from a UE 104 to the IMS 120 using SIP protocol or among various entities within the IMS 120.

Responsive to the SIP: SOS invite service, the GMLC system(s) 130 may perform a location look-up at 322. This may entail accessing the USD 132 to retrieve subscriber information that may be used to connect the UE 104 to a nearby PSAP and/or send emergency notification SMS messages, according to example embodiments.

At 324 the GMLC system(s) 130 may retrieve the subscriber's name, MSISDNs of registered users to be notified, and their corresponding serving S-CSCF from a profile of the user 102. This look-up information may be received by the GMLC system(s) 130 based at least in part on accessing the USD 132 at 324.

At 328, the GMLC system(s) 130 may send the E-CSCF system(s) 210 an acknowledgement. In example embodiments, the acknowledgement may be in the form of a "200 OK" acknowledgement as part of a SIP between the GMLC system(s) 130 and the E-CSCF system(s) 210. The SIP: 200 OK transmission may indicate an acknowledgement of receiving the SIP: SOS invite service 320.

At 330, the E911 emergency call user plane may be established. This may be a completion of the process started at 312. At this point, the E911 call may be underway, where the UE 104 has a voice connection with its nearest, or at least relatively close, PSAP system 140.

At 332, the MME system(s) 114 may provide a location answer to the GMLC system(s) 130. This location answer may be responsive to the provided location request at 314. This location answer may include location information of the UE 104. In some cases, this may be a latitude and longitude of the UE 104. This latitude and longitude may be determined based at least in part on global navigation satellite signals (GNSS), such as global positioning satellite (GPS). In this case, the UE 104 may perform triangulation with the received GNSS to determine its own location and send that information to the MME system(s) 114 during the NAS uplink/downlink communications at 316 and 318. In some cases, other location information may be provided by the UE 104, such as altitude information, or other suitable location coordinates other than latitude or longitude.

In example embodiments, other location information may be provided, such as the last known location of the UE 104. For example, if the UE 104 enters a building where it can no longer determine its own location from GNSS signals, the UE 104 may provide its last known location just prior to entering the building. In some other example embodiments, the UE 104 may be configured to determine its own location based at least in part on a combination of mechanisms. For example, if the UE 104 is aware of a recent, but not up to date location from GPS signals, the UE 104 may be able to get a more refined and/or precise current location relative to its last known location form GPS signals, by using inertial sensors, such as microelectromechanical system (MEMS)-based accelerometers. In yet other example embodiments, UE 104 may determine its own location, or the MME system(s) 114 may determine the UE 104 location, based at least in part on an identification of a WiFi AP 112 and a registry of locations of WiFi APs. In still other example embodiments, the UE 104 may provide a Mac address of a WiFi AP to which it is connected.

At 334, the GMLC system(s) 130 may store the location information (e.g., latitude and longitude) of the caller (e.g., UE 104). At 336, the GMLC system(s) 130 may generate an emergency notification SMS message. The emergency notification SMS message may include one or more information about the name of the user 102 associated with the UE 104 from which the E911 call originated, the time of the E911 call as recorded at 308, the location information as received at 332 and/or stored at 334, and/or a notification that the recipient had been designated as an emergency contact of the user 102.

At 338, a SIP: Message (GSM SMS) may be sent by the GMLC system(s) 130 to the S-CSCF system(s) 220 for each of the registered contact of the user 102. The emergency notification SMS message may then be routed by the S-CSCF system(s) 220 to the IMP system(s) 230, which may, in turn, route the emergency notification SMS to the SMS-SC system(s) 240, which may then deliver the emergency notification SMS to each of the registered contacts at 340.

It should be noted that some of the operations of method 300 may be performed out of the order presented, with additional elements, and/or without some elements. Some of the operations of method 300 may further take place substantially concurrently and, therefore, may conclude in an order different from the order of operations shown above. It should also be noted that in some cases, there may be other components of the IMS 120 involved in one or more of the operations, as described herein.

Figure 4:
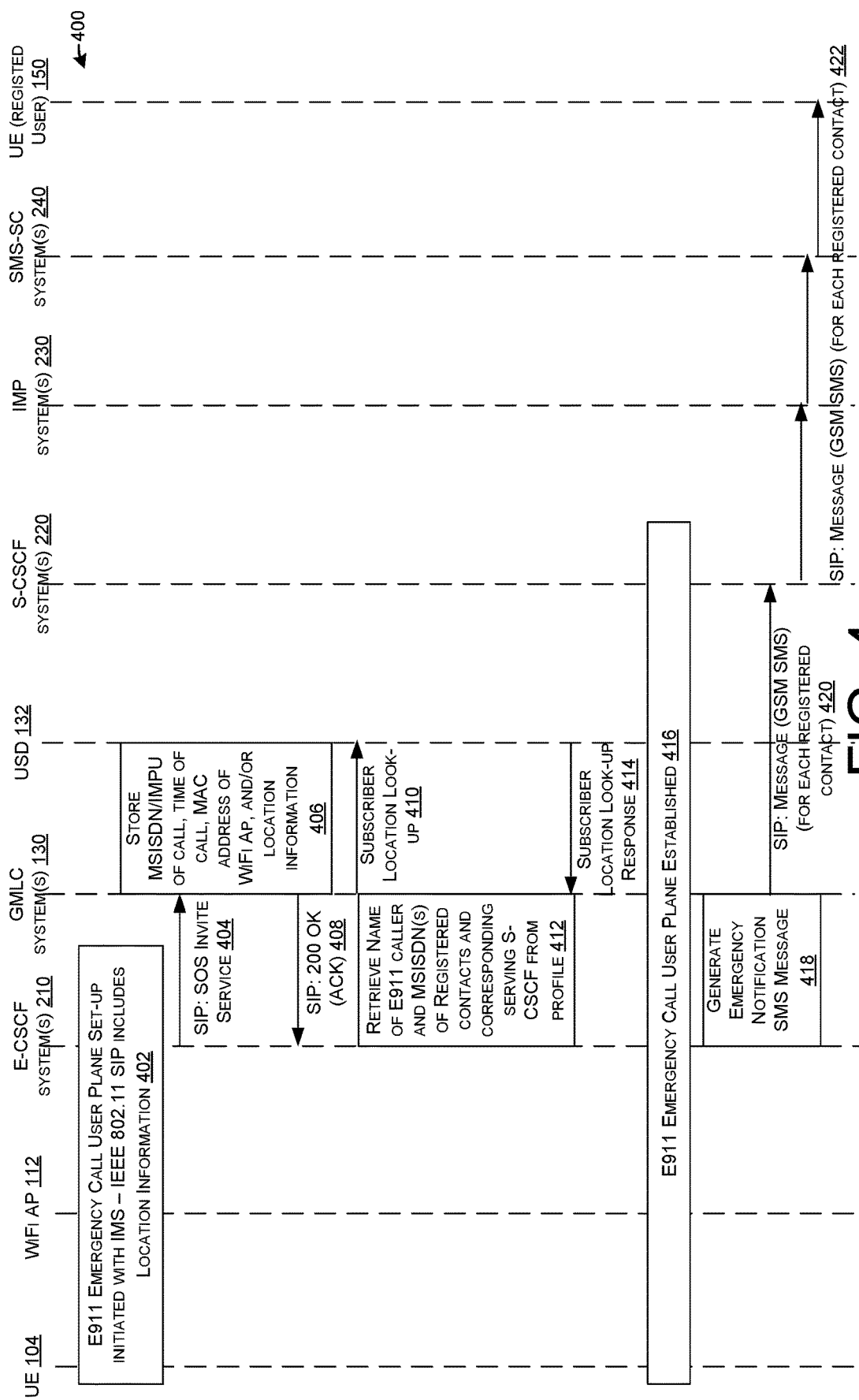
FIG. 4 illustrates a flow diagram of an example method by which emergency notification SMS messages are sent to registered contacts when E911 is called via voice over WiFi (VoWiFi) by a user, in accordance with example embodiments of the disclosure.

FIG. 4 illustrates a flow diagram of an example method 400 by which emergency notification SMS messages are sent to registered contacts when E911 is called via voice over WiFi (VoWiFi) by a user, in accordance with example embodiments of the disclosure.

At 402, E911 emergency call user plane set-up may be initiated with IMS 120. The IEEE 802.11 SIP may include location information of the UE 104. In some cases, the location information may be the latitude and longitude of the UE 104. In other cases, the location information may be the MAC address of the WiFi AP 112 through which the E911 call is placed. The location information may be determined and/or reported in a manner similar to that discussed above in conjunction with method 300 of FIGS. 3A and 3B. The location information, as latitude and longitude, in example embodiments, may be received from the UE 104 in extensible markup language (XML) data.

At 404, the E-CSFC system(s) 220 may start a session initiation protocol (SIP): SOS invite service with the GMLC system(s) 130. This may entail the E-CSCF system(s) 210 sending the GMLC system(s) 130 identifying information of the UE 104, as well as any location information received during the initiation of the of the E911 call user plane at 402.

At 406, the GMLC system(s) 130 may store the MSISDN and/or internet protocol multimedia public identity (IMPU), along with the time of the call, the MAC address of the WiFi AP 112, and/or location information of the UE 104. This information may, in example embodiments, be stored locally on the GMLC system(s) 130. At 408, a SIP: 200 OK acknowledgement may be sent by the GMLC system(s) 130 to the E-CSCF system(s) 210 to acknowledge that the GMLC system(s) 130 are acting upon the SIP: SOS invite service, as received at 404.

Responsive to the SIP: SOS invite service, the GMLC system(s) 130 may perform a location look-up at 410. This may entail accessing the USD 132 to retrieve subscriber information that may be used to connect the UE 104 to a nearby PSAP and/or send emergency notification SMS messages, according to example embodiments.

At 412 the GMLC system(s) 130 may retrieve the subscriber's name, MSISDNs of registered users to be notified, and their corresponding serving S-CSCF from a profile of the user 102. This look-up information may be received by the GMLC system(s) 130 based at least in part on accessing the USD 132 at 410. This information may be received as a subscriber location response to the GMLC system(s) 130 at 414.

At 416, the E911 emergency call user plane may be established. This may be a completion of the process started at 402. At this point, the E911 call may be underway, where the UE 104 has a voice connection with its nearest, or at least relatively close, PSAP system 140.

At 418, the GMLC system(s) 130 may generate an emergency notification SMS message. The emergency notification SMS message may include one or more information about the name of the user 102 associated with the UE 104 from which the E911 call originated, the time of the E911 call as recorded at 406, the location information as received at 404 and/or stored at 406, and/or a notification that the recipient had been designated as an emergency contact of the user 102.

At 420, a SIP: Message (GSM SMS) may be sent by the GMLC system(s) 130 to the S-CSCF system(s) 220 for each of the registered contact of the user 102. The emergency notification SMS message may then be routed by the S-CSCF system(s) 220 to the IMP system(s) 230, which may, in turn, route the emergency notification SMS to the SMS-SC system(s) 240, which may then deliver the emergency notification SMS to each of the registered contacts at 422.

As in the operations of FIGS. 3A and 3B, it should be noted that some of the operations of method 400 may be performed out of the order presented, with additional elements, and/or without some elements. Some of the operations of method 400 may further take place substantially concurrently and, therefore, may conclude in an order different from the order of operations shown above. It should also be noted that in some cases, there may be other components of the IMS 120 involved in one or more of the operations, as described herein.

Figure 5:
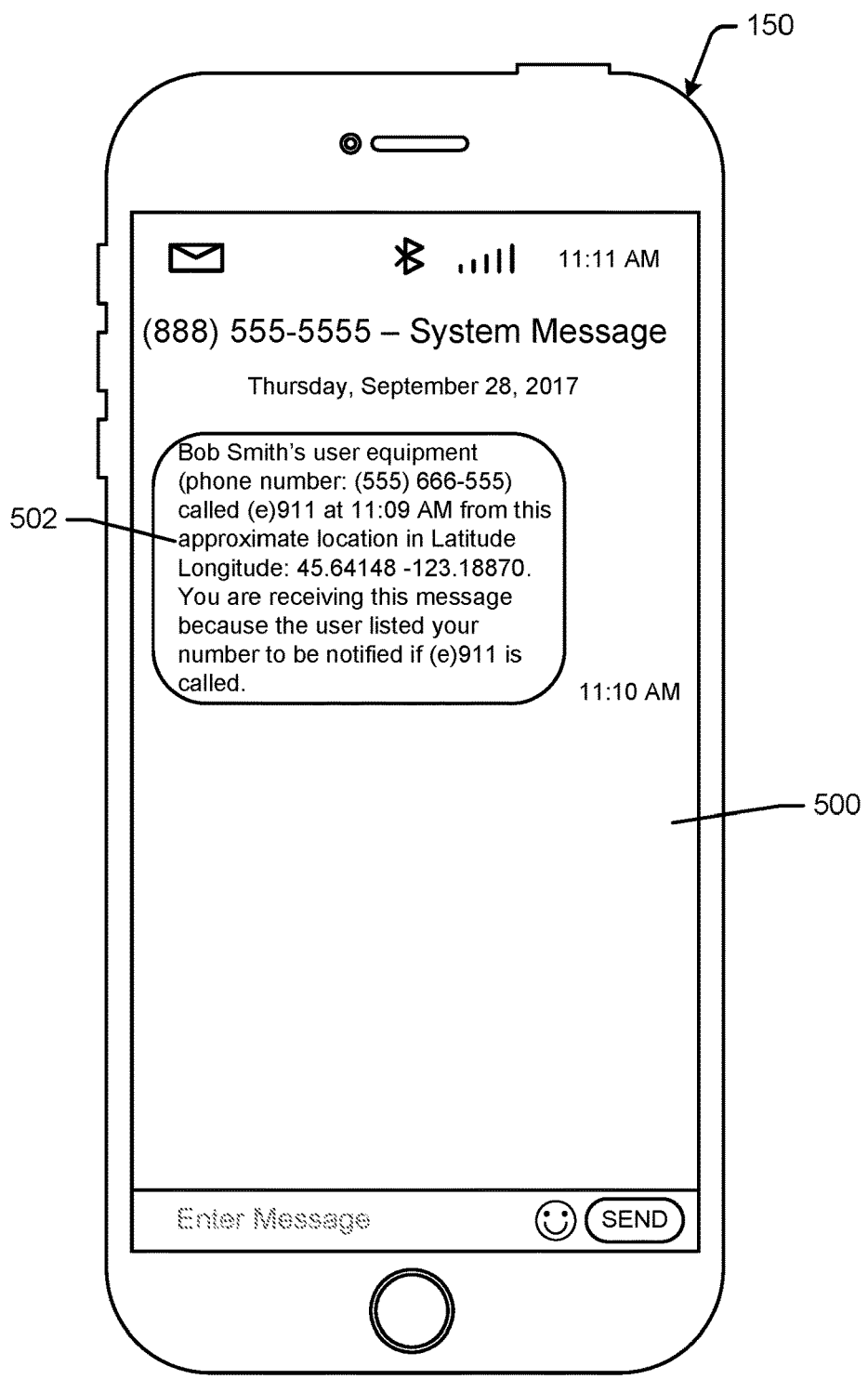
FIG. 5 illustrates a schematic diagram of an example user equipment (UE) where an emergency notification SMS message is received, in accordance with example embodiments of the disclosure.

FIG. 5 illustrates a schematic diagram of an example user equipment (UE) 150 where an emergency notification SMS message 502 is received, in accordance with example embodiments of the disclosure. The UE 150 may have a user interface, such as a touch screen 500, on which the emergency notification SMS message 502 may be displayed.

The emergency notification SMS message, as shown, includes a variety of information, such as an identification of the user 102 to whom the UE 104 from which the E911 call originated belongs, an identification of the phone number of the UE 104, a time when the E911 call was placed, a location in the form of a latitude and longitude from where the E911 call was placed, and a message indicating that the recipient is on the user's emergency notification list as a registered contact. It should be noted that in other example emergency notification SMS messages, there may be more, fewer, and/or different pieces of information. For example, in some cases, such as when the E911 call is placed via VoWiFi, a MAC address may be provided instead of the latitude and longitude data.

It should also be noted that although the UE 150 is depicted as a smartphone, the UE 150 may be any variety of devices on which text messages may be received. It will further be appreciated that when location information, such as in the form of latitude and longitude coordinates, are provided a user of the UE 150 may use an over the top (OTT) application to determine a location in a different, and perhaps a more useful, form, such as with an indication of state, city, street, building, etc. The OTT application may be of any suitable type, such as commercially available mapping software, for example GOOGLE MAPS.

Figure 6:
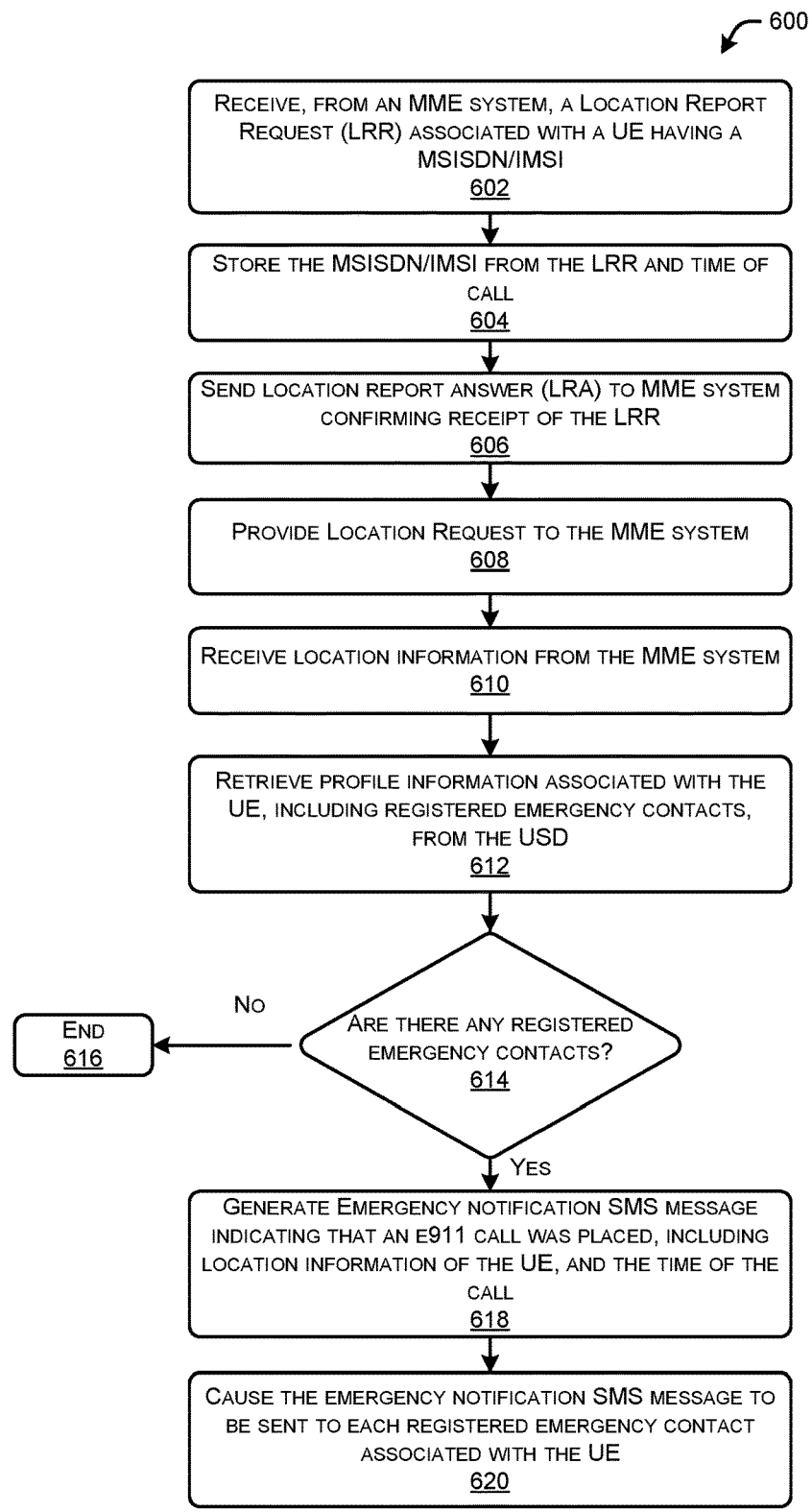
FIG. 6 illustrates a flow diagram of an example method for sending emergency notification SMS message(s) during a VoLTE E911 call, in accordance with example embodiments of the disclosure.

FIG. 6 illustrates a flow diagram of an example method 600 for sending emergency notification SMS message(s) during a VoLTE E911 call, in accordance with example embodiments of the disclosure. The method 600 may be performed by the GMLC system(s) 130 in cooperation with one or more elements of environments 100, 200.

At block 602, a location report request (LRR) for a UE 104 having a MSISDN/IMSI may be received from an MME. In this case, the UE 104 may have been used to dial E911. The LRR may include location data of the user 102.

At block 604, the MSISDN/IMSI and the time of the call may be stored. The time of the call may be determined by the GMLC system(s) 130 by accessing and system clock and recording the time when the LRR was received. The MSISDN/IMSI and/or the time of the call may be stored in system memory of the GMLC system(s) 130, or any other suitable location.

At block 606, a location report answer (LRA) may be sent to the MME system(s) 114 confirming the receipt of the LRR. At block 608, a location request may be provided to the MME system(s) 114. The location request may be a request for the location (e.g., latitude and longitude) of the UE 104 form which the E911 call was placed.

At block 610, location information may be received from the MME system(s) 114. In some cases, the location information may include the current or last known latitude and longitude of the UE 104. In other cases, there may be other location information that may be reported from the MME system(s) 114 to the GMLC system(s) 130.

At block 612, user profile information associated with the UE 104, including registered emergency contact information, may be retrieved from the USD 132. This emergency contact information may have been stored on the USD 132 previously, based at least in part on a selection of emergency contacts by the user 102 to whom the UE 104 is registered. The USD 132 may further include information about S-CSCF system(s) 220 corresponding to each of the emergency contacts. This information may be used by the GMLC system(s) 130 for the purpose of routing the emergency notification SMS messages that are to be sent according to the disclosure. In example embodiments, the emergency contact information may include MSISDN and/or IMSI information associated with each of the registered emergency contacts of the user 102.

At block 614, it may be determined whether there are any registered emergency contacts, as determined from the user profile at the USD 132. If there are no emergency contacts, then the method 600 may end at block 616, and no emergency notification SMS messages may be sent. On the other hand, if there are emergency contacts on the user's profile, then at block 618, an emergency notification SMS message may be generated, indicating that an E911 call was placed, including location information of the UE, and the time of the call. As discussed above, in some example embodiments, more or fewer pieces of information may be provided in the emergency notification SMS message. At block 620, the emergency notification SMS message may be caused to be delivered to each of the emergency contacts associated with the UE.

Figure 7:
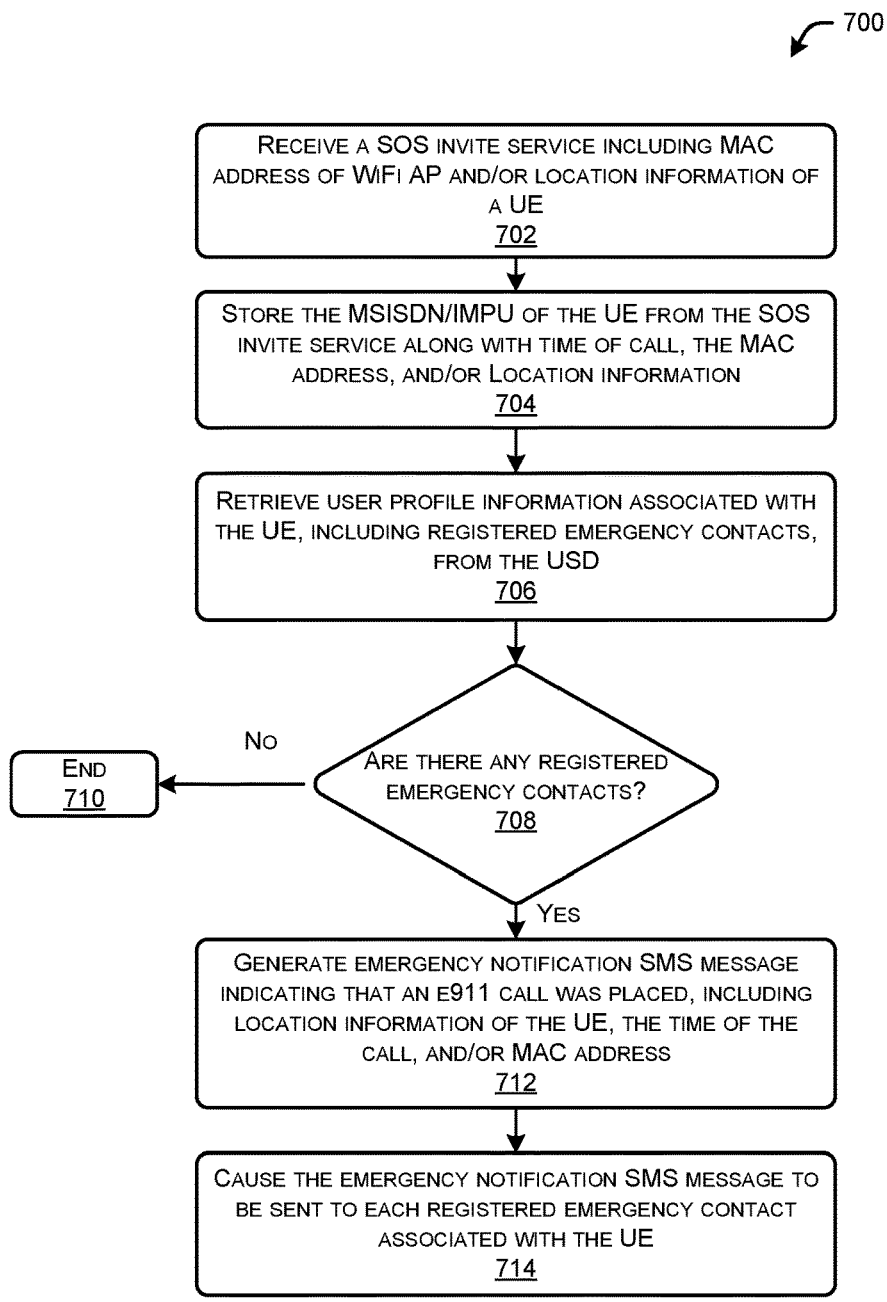
FIG. 7 illustrates a flow diagram of an example method for sending emergency notification SMS message(s) during a VoWiFi E911 call, in accordance with example embodiments of the disclosure.

FIG. 7 illustrates a flow diagram of an example method 700 for sending emergency notification SMS message(s) during a VoWiFi E911 call, in accordance with example embodiments of the disclosure. The method 700 may be performed by the GMLC system(s) 130 in cooperation with one or more elements of environments 100, 200.

At block 702, a SOS invite service may be received from a WiFi AP 112. The SOS invite service may include a media access control (MAC) address of the WiFi AP 112 via which the VoWiFi E911 call is placed and/or location information of the UE 104 from which the E911 call is placed. The SOS invite service may further include identifying information about the UE 104 from which the E911 call is placed. This identifying information may include the MSISDN and/or IMPU.

At block 704, the MSISDN/IMPU, the time of the call, the MAC address, and/or location information may be stored. This information may be stored in memory of the GMLC system(s) 130, or any other suitable location. The time of the call may be determined by the GMLC system(s) 130 by accessing a system clock and recording the time when the SOS invite service was received.

At block 706, user profile information associated with the UE 104, including registered emergency contact information, may be retrieved from the USD 132. This emergency contact information may have been stored on the USD 132 previously, based at least in part on a selection of emergency contacts by the user 102 to whom the UE 104 is registered. The USD 132 may further include information about S-CSCF system(s) 220 corresponding to each of the emergency contacts. This information may be used by the GMLC system(s) 130 for the purpose of routing the emergency notification SMS messages that are to be sent according to the disclosure. In example embodiments, the emergency contact information may include MSISDN and/or IMSI information associated with each of the registered emergency contacts of the user 102.

At block 708, it may be determined whether there are any registered emergency contacts, as determined from the user profile at the USD 132. If there are no emergency contacts, then the method 700 may end at block 710, and no emergency notification SMS messages may be sent while the UE 104 is on the E911 call. On the other hand, if there are emergency contacts on the user's profile, then at block 712, an emergency notification SMS message may be generated, indicating that an E911 call was placed, including location information of the UE 104, the time of the call, and/or the MAC address of WiFi AP 112. As discussed above, in some example embodiments, more or fewer pieces of information may be provided in the emergency notification SMS message. At block 714, the emergency notification SMS message may be caused to be delivered to each of the emergency contacts associated with the UE 104.

Figure 8:
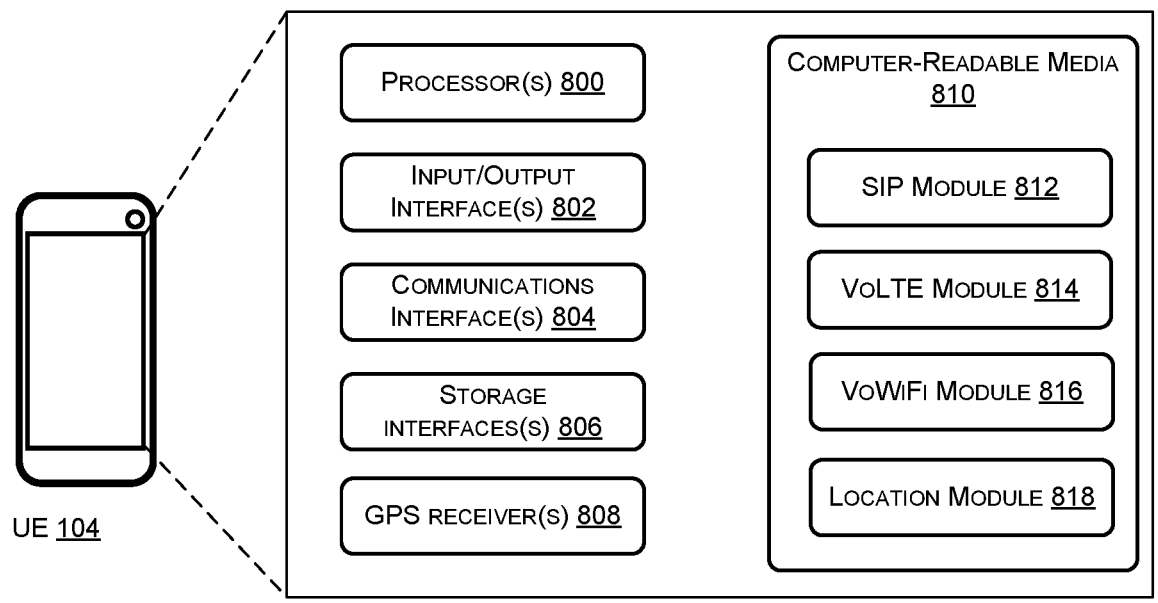
FIG. 8 illustrates a block diagram of an example user equipment (UE) from which an E911 call may be placed, in accordance with example embodiments of the disclosure.

FIG. 8 illustrates a block diagram of an example user equipment (UE) 104 from which an E911 call may be placed, in accordance with example embodiments of the disclosure.

In accordance with various embodiments disclosed herein, the terms user equipment (UE), communication device, device, wireless communication device, wireless device, mobile device, terminal, wireless terminal, mobile terminal, and client device, may be used interchangeably herein to describe the UE 104 or UE 150. The UE 104, 150 may be configured for transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 104 may include one or more processor(s) 800, one or more input/output (I/O) interface(s) 802, one or more communication interface(s) 804, one or more storage interface(s) 806, one or more GPS receiver(s) 808, and computer-readable media 810.

In some implementations, the processors(s) 800 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 800 may possess its own local memory, which also may store program modules, program data, and/or one or more operating systems. The one or more processor(s) 800 may include one or more cores.

The one or more input/output (I/O) interface(s) 802 may enable the UE 104 to detect interaction with a user 102 and/or other UEs 104, 150. The I/O interface(s) 802 may include a combination of hardware, software, and/or firmware and may include software drivers for enabling the operation of any variety of I/O device(s) integrated on the UU 104 or with which the UE 104 interacts, such as displays, microphones, speakers, cameras, switches, and any other variety of sensors, or the like. In example embodiments, the I/O devices of the UE 104 may include microelectromechanical system (MEMS) devices, such as accelerometers or other sensors that may provide positional and/or location information of the UE 104.

The communications interface(s) 804 may enable the UE 104 to communicate via the one or more network(s). The communications interface(s) 804 may include a combination of hardware, software, and/or firmware and may include software drivers for enabling any variety of protocol-based communications, and any variety of wireline and/or wireless ports/antennas. For example, the communications interface(s) 804 may comprise one or more of a cellular radio, a wireless (e.g., IEEE 802.1x-based) interface, a Bluetooth® interface, and the like. In some embodiments, the communications interface(s) 804 may include radio frequency (RF) circuitry that allows the UE 104 to transition between various standards. The communications interface(s) 804 may further enable the UE 104 to communicate over circuit-switch domains and/or packet-switch domains.

The storage interface(s) 806 may enable the processor(s) 800 to interface and exchange data with the computer-readable medium 810, as well as any storage device(s) external to the UE 104. The storage interface(s) 806 may further enable access to removable media, such as a subscriber identification module (SIM) card of the UE 104.

The GPS receiver(s) 808 may enable the receipt and processing of global navigation satellite system (GNSS) signals, such as signals from the global positioning satellite (GPS) system. These signals may be processed by the processor(s) 800 to determine a location of the UE 104, using techniques such as triangulation.

The computer-readable media 810 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 may be implemented as computer-readable storage media (CRSM), which may be any available physical media accessible by the processor(s) 800 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 300. The computer-readable media 810 may have an operating system (OS) and/or a variety of suitable applications stored thereon. The OS, when executed by the processor(s) 800 may enable management of hardware and/or software resources of the UE 104.

Several modules such as instruction, data stores, and so forth may be stored within the computer-readable media 810 and configured to execute on the processor(s) 800. The computer readable media 810 may have stored thereon a SIP module 812, a VoLTE module 814, a VoWiFi module 816, and a location module 818. It will be appreciated that each of the modules 812, 814, 816, 818, may have instructions stored thereon that when executed by the processor(s) 800 may enable various functions pertaining to the operations of the UE 104.

The instructions stored in the SIP module 812, when executed by the processor(s) 800, may configure the UE 104 to establish communications, as well as control plane and/or user plane functions. The processor(s) 800 may be configured to receive requests and respond with appropriate responses and/or acknowledgments.

The instructions stored in the VoLTE module 814, when executed by the processor(s) 800, may configure the UE 104 to initiate and conduct voice over long term evolution (VoLTE) calls. In some example embodiments, the processor(s) 800 may be configured to engage with the eNodeB 110 and/or MME system(s) 114 to establish a call, such as an E911 call.

The instructions stored in the VoWiFi module 816, when executed by the processor(s) 800, may configure the UE 104 to initiate and conduct voice over WiFi (VoWiFi) calls. In some example embodiments, the processor(s) 800 may be configured to engage with the WiFi AP 112 to establish a call, such as an E911 call.

The instructions stored in the location module 818, when executed by the processor(s) 800, may configure the UE 104 to determine and report its own location. The processor(s) 800 may be configured to use any variety of sensor data (e.g., accelerometer data) and/or signals (e.g., GPS signals) to make a determination of position.

Figure 9:
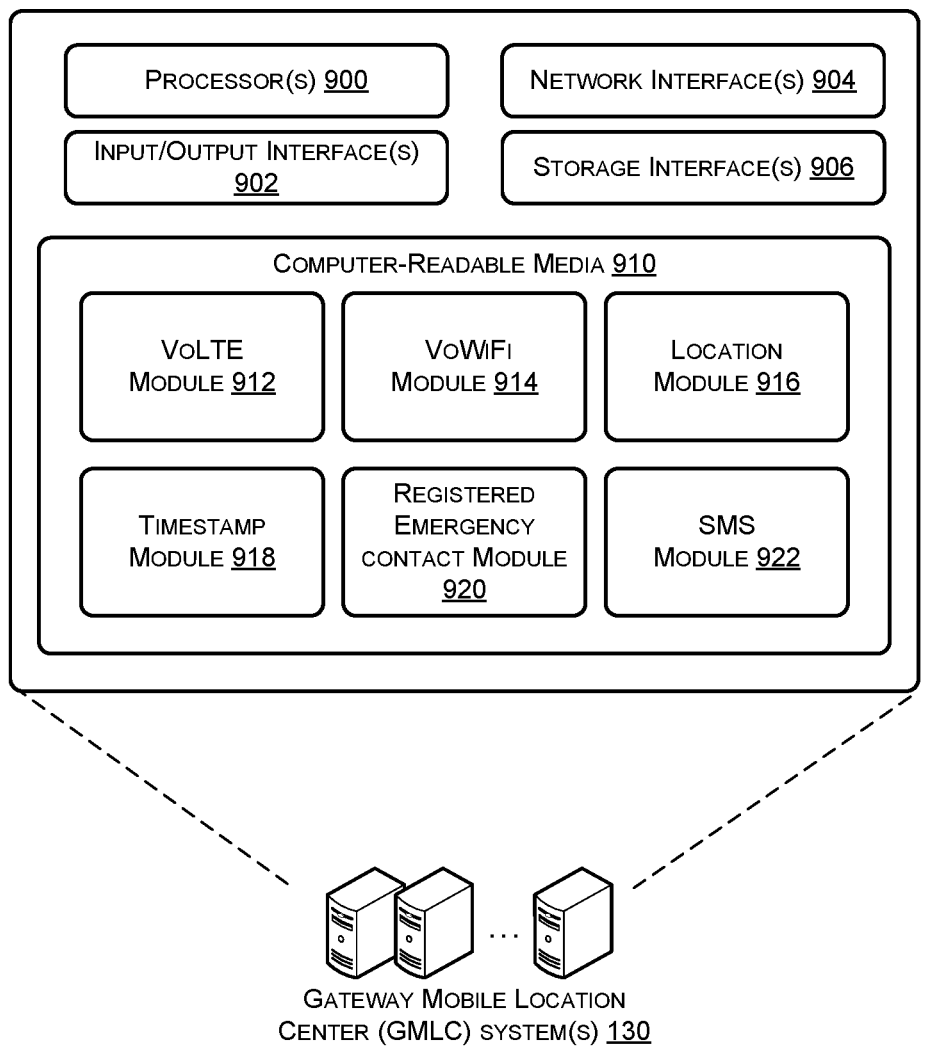
FIG. 9 illustrates a block diagram of example gateway mobile location center (GMLC) system(s) that may provide emergency notification SMS messages to designated contacts when a user calls E911, in accordance with example embodiments of the disclosure.

FIG. 9 illustrates a block diagram of example gateway mobile location center (GMLC) system(s) 130 that may provide emergency notification SMS messages to designated contacts when a user calls E911, in accordance with example embodiments of the disclosure.

The GMLC system(s) 130 may include one or more processor(s) 900, one or more input/output (I/O) interface(s) 902, one or more communication interface(s) 904, one or more storage interface(s) 906, and computer-readable media 910. The descriptions of the one or more processor(s) 900, the one or more input/output (I/O) interface(s) 902, the one or more network interface(s) 904, the one or more storage interface(s) 906, and the computer-readable media 910 may be substantially similar to the descriptions of the one or more processor(s) 800, the one or more input/output (I/O) interface(s) 802, the one or more network interface(s) 804, the one or more storage interface(s) 806, and the computer-readable media 810, respectively, as described in FIG. 8 with respect to the UE 104, and in the interest of brevity, will not be repeated here.

Several modules such as instruction, data stores, and so forth may be stored within the computer-readable media 910 and configured to execute on the processor(s) 900. The computer readable media 910 may have stored thereon a VoLTE module 912, a VoWiFi module 914, a location module 916, a timestamp module 918, a registered emergency contact module 920, and a SMS module 922. It will be appreciated that each of the modules 912, 914, 916, 918, 920, 922 may have instructions stored thereon that when executed by the processor(s) 900 may enable various functions pertaining to processing E911 calls and sending emergency notification SMS messages.

The instructions stored in the VoLTE module 912, when executed by the processor(s) 900, may configure the GMLC system(s) 130 to handle E911 calls over VoLTE by interacting with the MME system(s) 114 and/or other elements of the IMS 120 and connecting the E911 call to the appropriate PSAP.

The instructions stored in the VoWiFi module 914, when executed by the processor(s) 900, may configure the GMLC system(s) 130 to handle E911 calls over VoWiFi by interacting with the WiFi AP 112 and/or elements of the IMS 120 and connecting the E911 call to the appropriate PSAP.

The instructions stored in the location module 916, when executed by the processor(s) 900, may configure the GMLC system(s) 130 to interact with the MME system(s) 114, WiFi AP 112, or any other systems to determine a location or MAC address associated with a UE 104 from which an E911 call originates.

The instructions stored in the timestamp module 918, when executed by the processor(s) 900, may configure the GMLC system(s) 130 to record a time of when a E911 call is identified. The identification of the call may come from any entity of the IMS 120 and/or a WiFi AP 112. The time information of the E911 call may be stored in the computer-readable memory 910, or any other suitable location, so that it can later be accessed to generate emergency notification SMS message(s).

The instructions stored in the registered emergency contact module 920, when executed by the processor(s) 900, may configure the GMLC system(s) 130 to interact with the USD 132 to access a user profile to determine a variety of subscriber information, including registered emergency contacts of the user 102. The emergency contacts may have been previously stated and saved to the user profile on the USD 132. The registered emergency contact information may include MSISDN/IMSI information of the registered UE(s) 150, as well as the S-CFCS systems 230 corresponding to each of the registered UE(s) 150.

The instructions stored in the SMS module 922, when executed by the processor(s) 900, may configure the GMLC system(s) 130 to generate and send the emergency notification SMS messages. The generation of the emergency notification message may entail retrieving timestamp and/or location information from memory 910 to generate the emergency notification SMS. Once generated, the emergency notification SMS message may be sent via elements of the IMS 120 to the destination registered UE(s) 150.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
one or more processors; and
one or more computer-readable media storing computer-executable instructions that, when executed by the one or more processors, cause the one or more processors to:
receive, from an emergency-call session control function (E-CSFC) system, a session initiation protocol (SIP) message associated with a first user equipment (UE);
determine, based at least in part on the SIP message, that a voice over Internet Protocol (VoIP) emergency call has been placed from the first UE, the VoIP emergency call transmitted via a WiFi access point (AP);
determine, based at least in part on the SIP message, an identifier of the first UE;
determine a media access control (MAC) address of the WiFi AP;
determine as a determination, based at least in part on the identifier and by accessing a universal subscriber database (USD), a second UE that is registered to receive an emergency notification when the VoIP emergency call is placed from the first UE;
determine, by accessing the USD, that the second UE is associated with a first serving-call session control function (S-CSCF) system;
generate, based at least in part on the determination and based at least in part on the SIP message, a short message service (SMS) message indicating that the VoIP emergency call has been placed from the first UE, the SMS message including a notification of the MAC address; and
cause the SMS message to be sent to the second UE by sending the SMS message to the first S-CSCF.

2. The system of claim 1, wherein the SIP message indicates the MAC address of the WiFi AP.

3. The system of claim 1, wherein the computer-executable instructions, when executed, further cause the one or more processors to:
determine, based at least in part on the SIP message, a time of the VoIP emergency call, wherein generating the SMS message comprises providing an indication of the time of the VoIP emergency call.

4. The system of claim 1, wherein the computer-executable instructions, when executed, further cause the one or more processors to:
determine, based at least in part on accessing the USD and the identifier of the first UE, profile information associated with the first UE, wherein the profile information indicates that the second UE is registered to receive the emergency notification when the VoIP emergency call is placed from the first UE.

5. The system of claim 4, wherein
the profile information includes an indication that the second UE is associated with the first S-CSCF system.

6. The system of claim 4, wherein the computer-executable instructions, when executed, further cause the one or more processors to:
determine, based at least in part on the profile information, that a third UE is registered to receive the emergency notification when the VoIP emergency call is placed from the first UE;
determine, based at least in part on the profile information, that the third UE is associated with a second S-CSCF system; and
cause the SMS message to be sent to the third UE by forwarding the SMS message to the second S-CSCF system.

7. The system of claim 1, wherein the SMS message includes a location of the first UE comprising a latitude of the first UE and a longitude of the first UE.

8. A computer-implemented method, comprising:
receiving a session initiation protocol (SIP) message indicating that a voice over Internet Protocol (VoIP)

emergency call has been placed from a first user equipment (UE), the VoIP emergency call transmitted via a WiFi access point (AP);

determining, based at least in part on the SIP message, an identifier of the first UE;

determining, based at least in part on the SIP message, a media access control (MAC) address of the WiFi AP, wherein the WiFi AP is associated with transmitting the VoIP emergency call;

determining, based at least in part on the identifier and by accessing a universal subscriber database (USD), a second UE that is registered to receive an emergency notification when the VoIP emergency call is placed from the first UE;

determining, by accessing the USD, that the second UE is associated with a first serving-call session control function (S-CSCF) system;

generating, based at least in part on the SIP message, a short message service (SMS) message indicating that the VoIP emergency call has been placed from the first UE, the SMS message including a notification of the MAC address; and causing the SMS message to be sent to the second UE by sending the SMS message to the first S-CSCF.

9. The computer-implemented method of claim 8, wherein the SIP message indicates the MAC address of the WiFi AP.

10. The computer-implemented method of claim 8, wherein the SIP message is received from an emergency-call session control function (E-CSFC) system.

11. The computer-implemented method of claim 8, wherein the SIP message further includes location information about the first UE, wherein the location information is included in the SMS message.

12. The computer-implemented method of claim 11, wherein the location information comprises a latitude of the first UE and a longitude of the first UE.

13. The computer-implemented method of claim 8, further comprising:
determining, based at least in part on the SIP message, a time of the VoIP emergency call, wherein generating the SMS message comprises providing an indication of the time of the VoIP emergency call.

14. The computer-implemented method of claim 8, further comprising:
determining, based at least in part on accessing the USD and the identifier of the first UE, profile information associated with the first UE, wherein the profile information indicates that the second UE is registered to receive the emergency notification when the VoIP emergency call is placed from the first UE.

15. The computer-implemented method of claim 14, wherein the profile information includes an indication that the second UE is associated with the first S-CSCF system.

16. The computer-implemented method of claim 14, further comprising:

determining, based at least in part on the profile information, that a third UE is registered to receive the emergency notification when the VoIP emergency call is placed from the first UE;

determining, based at least in part on the profile information, that the third UE is associated with a second S-CSCF system; and causing the SMS message to be sent to the third UE by forwarding the SMS message to the second S-CSCF system.

17. A system comprising:
one or more processors; and
one or more computer-readable media storing computer-executable instructions that, when executed by the one or more processors, cause the one or more processors to:

receive a session initiation protocol (SIP) message indicating that a voice over Internet Protocol (VoIP) emergency call has been placed from a first user equipment (UE), the SIP message received from an emergency-call session control function (E-CSFC) system and indicating a location associated with the first UE;

determine, based at least in part on the SIP message, an identifier of the first UE;

determine, based at least in part on the SIP message, the location associated with the first UE;

determine, based at least in part on the identifier and by accessing a universal subscriber database (USD), a second UE that is registered to receive an emergency notification when the VoIP emergency call is placed from the first UE;

determine, based at least in part on the identifier and by accessing the USD, that the second UE is associated with a first serving-call session control function (S-CSCF) system;

generate, based at least in part on the SIP message, a short message service (SMS) message indicating that the VoIP emergency call has been placed from the first UE, the SMS message including a notification of the location; and send the SMS message to be sent to the first S-CSCF system.

18. The system of claim 17, wherein the computer-executable instructions, when executed, further cause the one or more processors to:
determine, based at least in part on the SIP message, a media access control (MAC) address of a WiFi access point (AP), wherein the WiFi AP is associated with transmitting the SIP message.

19. The system of claim 18, wherein the MAC address is included in the SMS message.

20. The system of claim 17, wherein the computer-executable instructions, when executed, further cause the one or more processors to:
determine, based at least in part on the SIP message, a time of the VoIP emergency call, wherein generating the SMS message comprises providing an indication of the time of the VoIP emergency call.

* * * * *